(12) United States Patent
Chelehmal (10) Patent No.: US 12,040,929 B2
(45) Date of Patent: Jul. 16, 2024

(54) DOUBLE-SIDEBAND CONTINUOUS WAVE TEST (CWT) TONE SIGNALS FOR DATA OVER CABLE SERVICE INTERFACE SPECIFICATION (DOCSIS) FULL DUPLEX (FDX) INTERFERENCE GROUP DISCOVERY

(71) Applicant: ARRIS Enterprises LLC, Suwanee, GA (US)

(72) Inventor: Majid Chelehmal, Parker, CO (US)

(73) Assignee: ARRIS Enterprises LLC, Suwanee, GA (US)

(*) Notice: Subject to any disclaimer, the term of this patent is extended or adjusted under 35 U.S.C. 154(b) by 27 days.

(21) Appl. No.: 18/087,700

(22) Filed: Dec. 22, 2022

(65) Prior Publication Data

US 2023/0198824 A1    Jun. 22, 2023

Related U.S. Application Data

(60) Provisional application No. 63/292,998, filed on Dec. 22, 2021.

(51) Int. Cl.
*H04L 27/26*    (2006.01)
*H04L 5/00*    (2006.01)

(52) U.S. Cl.
CPC .......... *H04L 27/266* (2013.01); *H04L 5/0007* (2013.01); *H04L 5/0048* (2013.01)

(58) Field of Classification Search
CPC . H04L 1/0026; H04L 5/0007; H04L 27/2601; H04L 5/0048; H04L 5/14; H04L 27/2613; H04L 5/0021; H04L 1/04; H04W 72/21; H04W 72/23; H04W 48/12; H04W 72/12; H04W 74/002; H04W 36/0061; H04W 72/04; H04W 72/044; H04B 1/7077; H04B 7/26; H04B 7/2618; H04B 1/7097; H04B 2201/709709; H04B 1/707; H04B 1/7105; H04B 2201/70701
USPC ........................................................ 375/262
See application file for complete search history.

(56) References Cited

U.S. PATENT DOCUMENTS

| | | | |
|---|---|---|---|
| 11,546,578 B2 * | 1/2023 | Bschor | H04L 5/14 |
| 2022/0069969 A1 * | 3/2022 | Young | H04L 5/003 |
| 2022/0407789 A1 * | 12/2022 | Chari | H04L 12/2869 |
| 2023/0155804 A1 * | 5/2023 | Maricevic | H04L 5/1423 370/276 |

* cited by examiner

*Primary Examiner* — Eva Y Puente
(74) *Attorney, Agent, or Firm* — Chernoff, Vilhauer, McClung & Stenzel, LLP (57) ABSTRACT

A cable mode includes a processor configured to receive fractional OFDM offset frequency spacing parameter and locations of CWT tone signals relative to locations of scattered pilot signals across an OFDM channel. The processor inserts pairs of CWT tone signals relative to the locations of the scattered pilot signals. The CWT tone signals are offset from each of the scattered pilot signals by a positive offset frequency and a negative offset frequency based on the fractional OFDM offset frequency spacing parameters. The CWT tone signals are transmitted in an upstream full duplex (FDX) subband. The CWT tone signals are processed to determine an average value of a Receive Modulation Error Ratio (RxMER) over a period of time in order to determine assigns of cable modems to interference groups.

23 Claims, 6 Drawing Sheets

DOUBLE-SIDEBAND CONTINUOUS WAVE TEST (CWT) TONE SIGNALS FOR DATA OVER CABLE SERVICE INTERFACE SPECIFICATION (DOCSIS) FULL DUPLEX (FDX) INTERFERENCE GROUP DISCOVERY

CROSS REFERENCE TO RELATED APPLICATIONS

The present application claims priority to U.S. Provisional Patent Application No. 63/292,998 filed Dec. 22, 2022, the content of which is incorporated herein by reference in its entirety.

BACKGROUND

The subject matter of the present disclosure relates generally to using one or more pairs of continuous wave test (CWT) tone signals offset from locations of scattered pilot signals based on fractional Orthogonal Frequency Division Multiplexing (OFDM) offset frequency spacing parameters.

In legacy DOCSIS, data can only be transmitted in one direction across any part of the spectrum. To address this issue, Data Over Cable Service Interface Specification (DOCSIS) Full Duplex (FDX) technology has been developed and standardized to allow the RF spectrum to be used simultaneously in both the upstream (US) and downstream (DS) directions over the cable access network. Thus, DOCSIS Full Duplex (FDX) is designed to significantly increase the upstream throughput to drive toward symmetrical DOCSIS services over the existing hybrid fiber-coax (HFC) access network. FDX can dynamically adjust both downstream and upstream throughput/bandwidth based on the user traffic demand. Selectable portion of the FDX spectrum (FDX sub-bands) can be assigned to either downstream or upstream based on traffic demand in each direction.

A FDX CMTS is responsible for managing the dynamic spectrum assignment by utilizing the given network topology and in coordination with the cable modems. Before permitting a modem to use an FDX subband, a test cable modem is used to transmit in an upstream FDX subband and one or more cable modems are used to measure the amount of interference seen in the downstream direction in the same subband. The objective is to assign modems into separate interference groups (IGs) based on the interference measurement results. If the amount of interference from the test cable modem seen by the measuring cable modems is determined to be above a pre-determined threshold, then the test cable modem is assigned to the IG associated with the measurer modems. Otherwise, the test cable modem must reside in a different IG.

Cable modem in the same IG must operate in frequency division duplexing (FDD) mode where all cable modems should share the same set of downstream and upstream FDX subbands. In contrast, modems in different IG group can simultaneously transmit in opposite direction in the same FDX subband without interfering with each other.

A test cable modem must transmit a sounding signal in the upstream FDX sub-band and measurer modems (listeners) must measure the impact on the downstream channel operating in the same subband. DOCSIS FDX provides two sounding methods: 1) OFDM Upstream Data Profile Sounding (OUDP) sounding and 2) CWT sounding. OUDP is broadband and convers the entire FDX subband spectrum including the PLC, continuous and scattered pilots and OFDM data sub-carriers. The CWT sounding only utilizes the scattered pilot locations to insert the CWT tones. Therefore, the test period for the CWT is longer than the OUDP method.

Thus, the speed and precision for performing the CWT sounding technique for IG discovery needs to be increased.

SUMMARY

An aspect of the present disclosure involves using one or more pairs of continuous wave test (CWT) tone signals offset from locations of scattered pilot signals based on fractional Orthogonal Frequency Division Multiplexing (OFDM) offset frequency spacing parameters.

In one embodiment, a cable mode includes a processor that determines a group of consecutive scattered pilot signals and/or a group of non-consecutive, periodic scattered pilot signals. The processor may determine that the plurality of CWT tone signals include first CWT upper-sideband tone signals offset from the scattered pilot signals by a first predetermined positive offset frequency based on a first of the fractional OFDM offset frequency spacing parameters, and first CWT lower-sideband tone signals offset from the scattered pilot signals by a first predetermined negative offset frequency based on the first of the fractional OFDM offset frequency spacing parameters.

In one embodiment, the processor determines that the plurality of CWT tone signals further include second CWT upper-sideband tone signals offset from the scattered pilot signals by a second predetermined positive offset frequency based on a second of the fractional OFDM offset frequency spacing parameters, and a second CWT lower-sideband tone signals offset from the scattered pilot signals by a second predetermined negative offset frequency based on the second of the fractional OFDM offset frequency spacing parameters.

In one embodiment, the processor further receives N fractional OFDM offset frequency spacing parameters, and determines that the plurality of CWT tone signals include N CWT tone signals offset from one of the scattered pilot signals based on a different one of the N fractional OFDM offset frequency spacing parameters, wherein the N CWT tone signals comprises an upper-sideband tone signal and a lower-sideband tone signal, wherein the upper-sideband tone signal is offset from one of the scattered pilot signals by the predetermined positive offset frequency based on one of the N fractional OFDM offset frequency spacing parameters and the lower-sideband tone signal is offset from the one of the scattered pilot signals by the predetermined negative offset frequency based on the one of the N fractional OFDM offset frequency spacing parameters.

In one embodiment, the processor executes instructions stored in memory to receive, in a downstream direction in a full duplex (FDX) subband used by a cable modem transmitting upstream continuous wave test (CWT) tone signals, a plurality of CWT tone signals offset from a group of scattered pilot signals by at least one predetermined positive offset frequency and at least one predetermined negative offset frequency based on fractional Orthogonal Frequency Division Multiplexing (OFDM) offset frequency spacing parameters, process the plurality of CWT tone signals to determine an average value of a Receive Modulation Error Ratio (RxMER) over a period of time, compare the average value of the RxMER over the period of time to a threshold of an interference group (IG) to measure Receive Modulation Error Ratio (RxMER), determine if the average value of the RxMER over the period of time is above a predetermined threshold, and assign the cable modem transmitting upstream CWT tone signals to the IG when the average value of the RxMER over the period of time is above the predetermined threshold, otherwise assign the cable modem transmitting upstream CWT tone signals to a different IG that provides Radio Frequency (RF) isolation to allow simultaneous upstream and downstream transmissions at a same frequency without interference.

In one embodiment, the processor transmitting upstream CWT tone signals is not included in a same IG and is allowed to simultaneously transmit in opposite directions in a same FDX subband when the average value of the RxMER over the period of time is not above the predetermined threshold.

In one embodiment, the processor reports to a Cable Modem Termination System (CMTS) the average value of the RxMER and assignment of an IG to the cable modem transmitting upstream CWT tone signals.

In one embodiment, the processor receives the plurality of CWT tone signals including first CWT upper-sideband tone signals offset from the scattered pilot signals by a first predetermined positive offset frequency based on a first of the fractional OFDM offset frequency spacing parameters, and a first CWT lower-sideband tone signals offset from the scattered pilot signals by a first predetermined negative offset frequency based on the first of the fractional OFDM offset frequency spacing parameters.

In one embodiment, the processor further receives second CWT upper-sideband tone signals offset from the scattered pilot signals by a second predetermined positive offset frequency based on a second of the fractional OFDM offset frequency spacing parameters, and second CWT lower-sideband tone signals offset from the scattered pilot signals by a second predetermined negative offset frequency based on the second of the fractional OFDM offset frequency spacing parameters.

In one embodiment, the processor further receives N fractional OFDM offset frequency spacing parameters, and determines that the plurality of CWT tone signals include N CWT tone signals offset from one of the scattered pilot signals based on a different one of the N fractional OFDM offset frequency spacing parameters, wherein the N CWT tone signals comprises an upper-sideband tone signal and a lower-sideband tone signal, wherein the upper-sideband tone signal is offset from one of the scattered pilot signals by the predetermined positive offset frequency based on one of the N fractional OFDM offset frequency spacing parameters and the lower-sideband tone signal is offset from the one of the scattered pilot signals by the predetermined negative offset frequency based on the one of the N fractional OFDM offset frequency spacing parameters.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to using one or more pairs of continuous wave test (CWT) tone signals offset from locations of scattered pilot signals based on fractional Orthogonal Frequency Division Multiplexing (OFDM) offset frequency spacing parameters.

Figure 1:
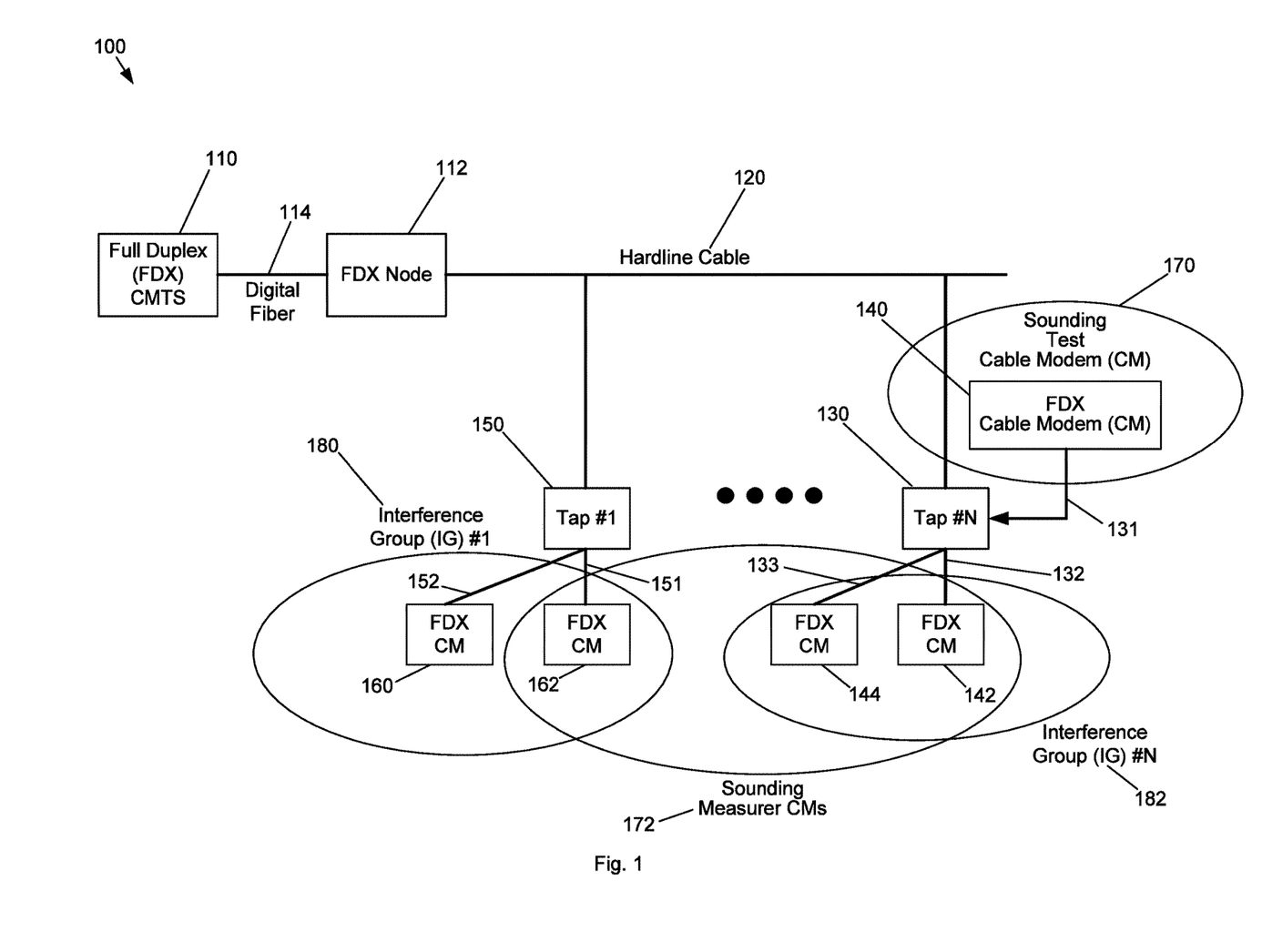
FIG. 1 illustrates a DOCSIS FDX network having cable modems for performing FDX sounding interference group discovery.

FIG. 1 illustrates a DOCSIS FDX network 100 having cable modems for performing FDX sounding interference group discovery.

FIG. 1 shows a FDX Cable Modem Termination System (CMTS) 110. FDX CMTS 110 provides high speed data services, such as cable Internet or Voice over Internet Protocol, to cable subscribers. FDX CMTS 110 communicates with a FDX Node 112 via a digital fiber link 114. FDX Node 112 leverages in-band echo-cancelation (EC) to enable simultaneous downstream (DS) transmission and upstream (US) reception on supported frequency bands. FDX enables upstream and downstream channels to concurrently exist over the same spectrum without the need to time share the use of the spectrum. FDX accomplishes this by using a combination of interference cancellation and intelligent scheduling. The FDX band is divided into sub-bands and the sub-band(s) are assigned for upstream or downstream operation.

FDX Node 112 is coupled to Hardline Cabe 120 to provide RF signals to Distribution Taps, or just Taps 130, 150. Subscriber Drops 131, 132, 133 run from Tap 130 to FDX Cable Modems (CMs) 140, 142, 144. Subscriber Drops 151, 152 run from Tap 150 to FDX CMs 160, 162.

FDX CMTS 110 is responsible for managing the dynamic spectrum assignment by utilizing the given network topology and in coordination with the cable modems. In FIG. 1, FDX CM 140 is identified as Sounding Test CM 170. Sounding Test CM 170 must transmit a sounding signal in the upstream FDX sub-band. In FIG. 1, FDX CMs 142, 144, 162 are identified as Sounding Measurer CMs 172. Sounding Measurer CMs 172 (listeners) must measure the impact on the downstream channel operating in the same subband. Thus, before permitting any modem to use an FDX subband, a test cable modem, Sounding Test CM 170, is used to transmit in an upstream FDX subband and one or more cable modems, Sounding Measurer CMs 172, are used to measure the amount of interference seen in the downstream direction in the same subband. The objective is to assign modems into separate interference groups (IGs) 180, 182 based on the interference measurement results. If the amount of interference from the Sounding Test CM 170 seen by the Sounding Measurer CMs 172 is determined to be above a pre-determined threshold, then the Sounding Test CM 170 is assigned to the IG of the Sounding Measurer CMs 172, e.g., IG #N 182 of FDX CM 144 and FDX CM 142. Otherwise, the Sounding Test CM 170 must reside in a different IG, such as IG #1 180. For example, FDX CMs 160, 162 in IG #1 180 must operate in frequency division duplexing (FDD) mode where all FDX CMs 160, 162 should share the same set of downstream and upstream FDX subbands. In contrast, modems in different IG groups, e.g., FDX CM 142 in IG #N 182 and FDX CM 160 in IG #1180 can simultaneously transmit in opposite directions in the same FDX subband without interfering with each other.

Figure 2:
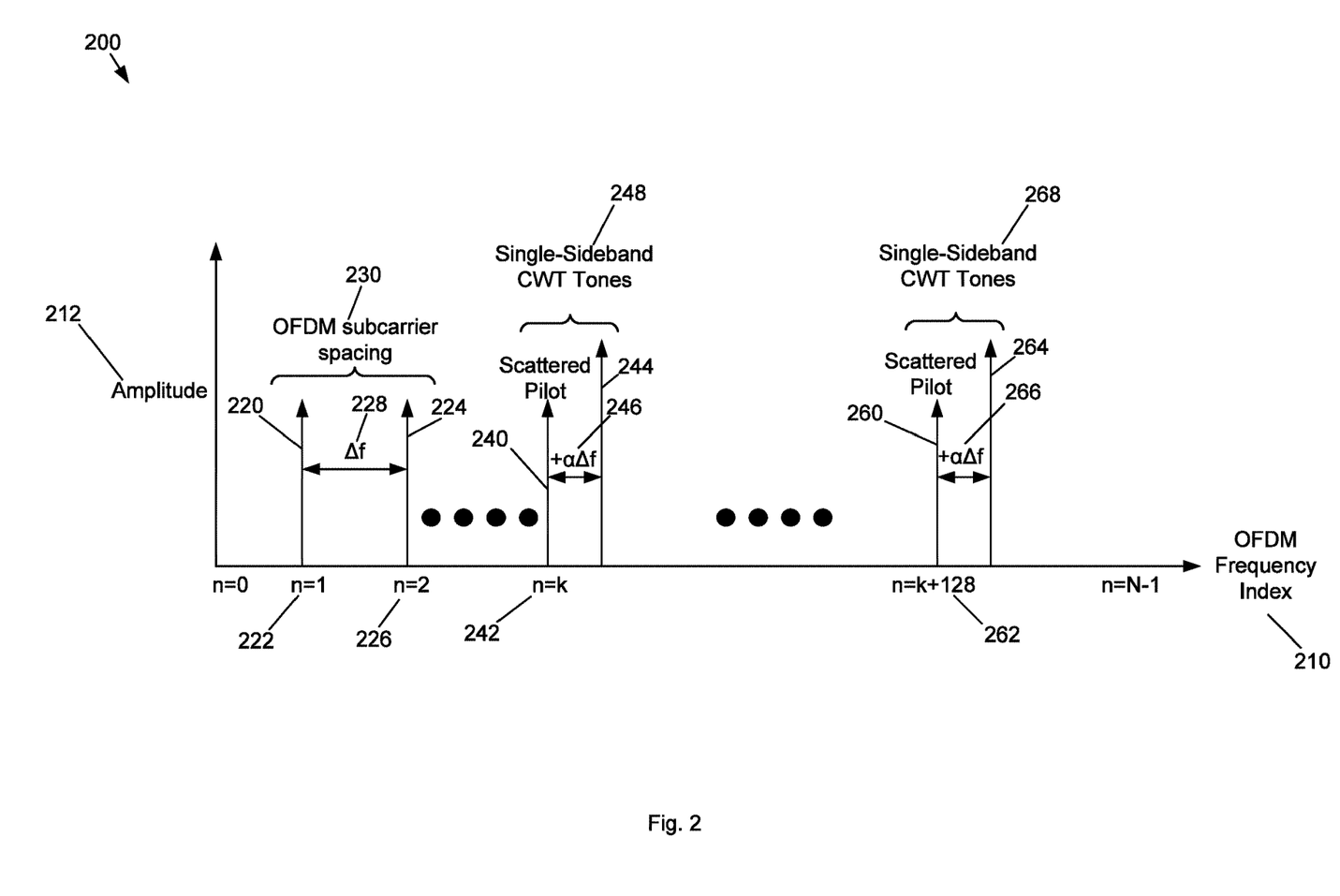
FIG. 2 illustrates a graph of single-sideband continuous wave test (CWT) tone signals offset from locations of scattered pilot signals by fractional OFDM offset frequency spacing parameters.

FIG. 2 illustrates a graph 200 of single-sideband continuous wave test (CWT) tone signals offset from locations of scattered pilot signals by fractional OFDM offset frequency spacing parameters.

The graph 200 in FIG. 2 includes an axis for OFDM Frequency Indices 210 and an axis for Amplitude 212. In FIG. 2, OFDM sub-carrier signals 220, 224 are shown. OFDM data sub-carrier signal 220 has an OFDM Frequency Index n=1 222. OFDM data sub-carrier 224 has an OFDM Frequency Index of n=2 226. Scattered Pilot signal 240 has an OFDM Frequency Index of n=k 242, and Scattered Pilot signal 260 has an OFDM Frequency Index of n=k+128 262. The OFDM data sub-carrier signals 220, 224 are separated by an OFDM subcarrier spacing 230 of Δf 228. The Scattered Pilot OFDM signals 240, 260 are separated by 128*Δf 228.

The DOCSIS FDX specification defines only single CWT tone signals 248, 268 (i.e., single-sideband). FIG. 2 shows Scattered Pilot signal 240 having a single-sideband CWT tone signal 244 that is offset by a positive fraction of the OFDM frequency spacing, +αΔf 246. FIG. 2 also shows Scattered Pilot signal 260 having a single-sideband CWT tone signal 264 that is offset by the positive fraction of the OFDM frequency spacing, +αΔf 266. The fraction of the OFDM frequency spacing may be a*50 kHz or a*25 KHz from each successive location of the Scattered Pilot signals 240, 260. In FIG. 2, OFDM data sub-carrier signals 220, 224 are not shown having adjacent single-sideband CWT tone signals in order to clearly show the OFDM subcarrier spacing 230. The value of the frequency offset is chosen such that the phase of the CWT changes by 180 degree between successive scattered pilot signal. By choosing a 180 degrees phase shift, the mean of the CWT sounding signal will be zero and only the variance (noise) remains non-zero to determine the interference group (IG). For the CWT sounding to be effective, the number of the scattered pilots and the measurement time should be large enough for a good characterization of the noise. This in turn reduces the amount of the throughput while the sounding CWT measurement is in progress.

Figure 3:
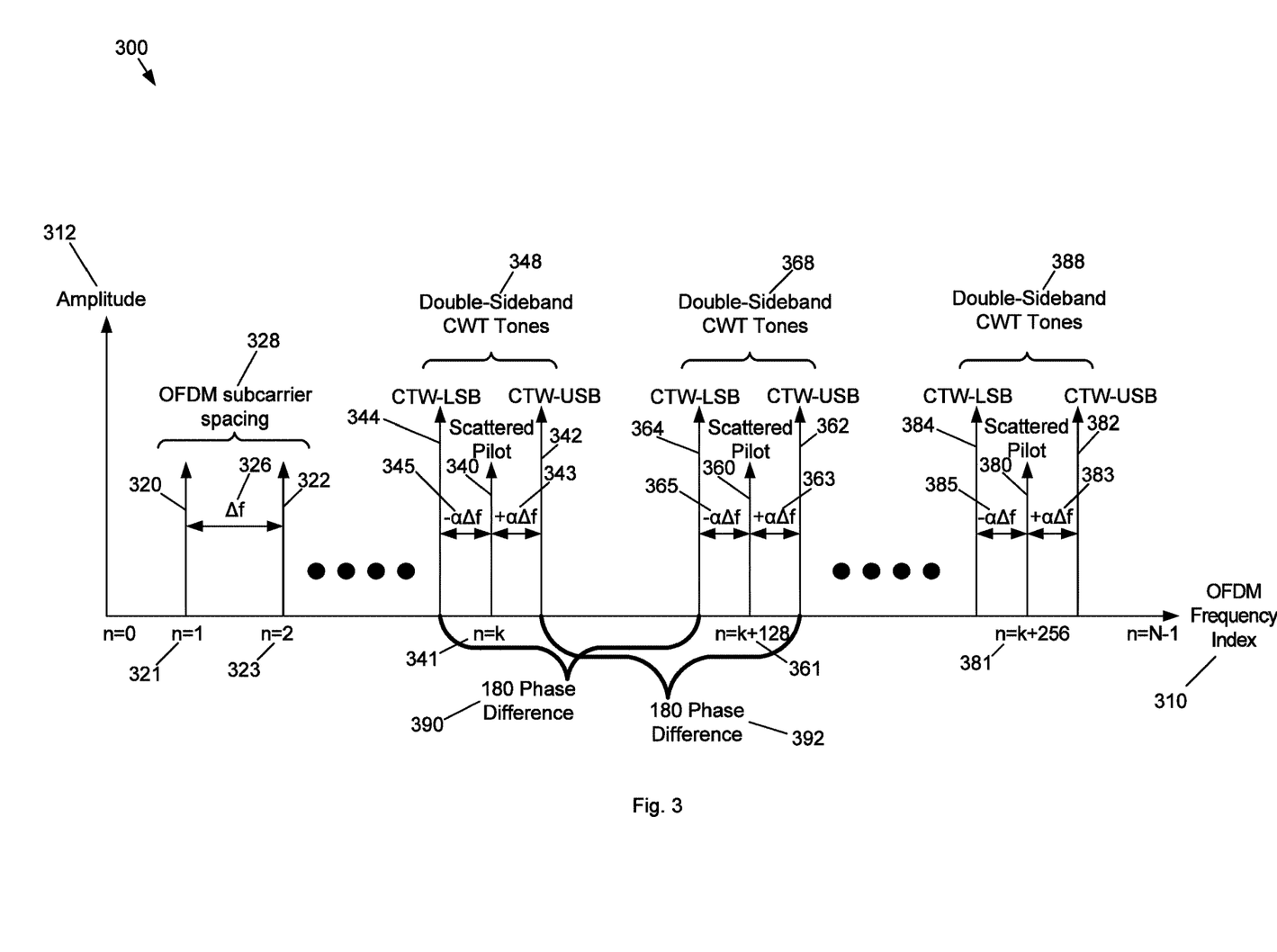
FIG. 3 illustrates a graph of double-sideband continuous wave test (CWT) tone signals offset from locations of scattered pilot signals by fractional OFDM offset frequency spacing parameters.

FIG. 3 illustrates a graph 300 of double-sideband continuous wave test (CWT) tone signals offset from locations of scattered pilot signals by fractional OFDM offset frequency spacing parameters.

The graph 300 in FIG. 3 also shows an axis for OFDM Frequency Indices 310 and an axis for Amplitude 312. Similar to FIG. 2, FIG. 3 shows OFDM sub-carrier signals 320, 322. OFDM data sub-carrier signal 320 has an OFDM Frequency Index n=1 321. OFDM data sub-carrier 322 has an OFDM Frequency Index of n=2 323. The OFDM data sub-carrier signals 320, 322 are separated by an OFDM subcarrier spacing 328 of Δf 326. In FIG. 3, Scattered Pilot signal 340 has an OFDM Frequency Index of n=k 341, Scattered Pilot signal 360 has an OFDM Frequency Index of n=k+128 361, and Scattered Pilot signal 380 has an OFDM Frequency Index of n=k+256 381. The Scattered Pilot signals 340, 360, 380 are separated from successive scattered pilot signals by a multiple of the OFDM subcarrier spacing 328 of 128*Δf 326.

The OFDM subcarrier locations are defined using the following equation (commonly called exponentially related subcarriers):

$$X[k] = A_k e^{j2\pi \Delta f k} \text{ for } k=0 \ldots, N-1,$$

where the term Δf denotes the OFDM frequency spacing in Hz. There are two frequency spacing values defined by DOCSIS 3.1:50 KHz for the 4K points FFT and 25 KHz for the 8K points FFT. The reciprocal of the frequency spacing is the OFDM FFT symbol time or symbol period and denoted by $T_{FFT}$.

The majority of the OFDM sub-carriers are used to carry user data. There are other useful OFDM subcarriers' assignment. Some of these sub-carriers are used as pilots for synchronization and channel estimation by the CMTS and in coordination with the cable modems. Some subcarriers are used as exclusion zones and carry zero information. Of these sub-carriers, the scattered pilot signals have special purpose for channel characterization and estimation. OFDM channel estimation is an iterative process and may include multiple OFDM symbols to characterize the channel. The scattered pilots have preassigned locations in the OFDM spectrum. The scattered pilot signals are spread across the entire spectrum and are separated by 128 sub-carrier FFT symbols. Locations of the scattered pilot signals are used for the insertion of the FDX CWT sounding pilots in the OFDM spectrum.

Referring to FIG. 1, Sounding Test CM 170 is programmed by the FDX CMTS 110 to insert the CWT tone signals for upstream FDX sub-band transmission. Several Sounding Measurer CMs 172 are used to measure the impact of interference seen in the opposite downstream in the same FDX sub-band. Each Sounding Measurer CMs 172 is commanded by the CMTS 110 to calculate the Receive Modulation Error Ratio (RxMER) and report the result to the CMTS 110. The average value of the RxMER over a period of time will be compared to an IG threshold to determine if the Sounding Test CM 170 belongs to the Sounding Measurer CMs 172 interference group, e.g., IG #N 182, or to a different interference group, e.g., IG #1 180.

As described above, the center frequency of the CWT tone signals, e.g., USB-CWT tone signal 342 and LSB-CWT tone signal 344 is slightly offset from the exact center frequency of each scattered pilot signal, e.g., Scattered Pilot signal 340. A small fraction of the frequency spacing αΔf must be used to shift the center frequency of the CWT tone signals to achieve the desirable result of providing an accurate estimation of the noise produced by the CWT tone signals. Adjustment of the OFDM scattered subcarrier for the CWT tone signals leads to following equation:

$$X_{CWT-USB}[k] = A_k e^{j2\pi \Delta f(k+\alpha)},$$

where the OFDM frequency index k defines the location of each scattered pilot used for CWT tone insertion.

Two statistical interference factors can be characterized by the measurer cable modem RxMER. These factors are the mean value of the interference and the variance of the interference. The mean value which is an indication of the frequency response is less of important for interference characterization than the variance. The RxMER based on the variance of the CWT tone signals is a true measurement of interference noise level. For this reason, the statistical mean value of the RxMER must be made zero.

A value of the $\alpha$ is calculated in order to change the phase of the CWT tone signals at the successive scattered by 180° ($\pi$). Since the scattered pilot signals are separated by 128 symbols, the phase difference between successive scattered pilot signals is defined as follows:

$$\Delta\Phi = 256\pi\alpha\left(\frac{T_{FFT} + T_{CP}}{T_{FFT}}\right),$$

where the term $T_{CP}$ is the OFDM cyclic prefix. By choosing the phase difference $\Delta\Phi=(2n+1)\pi$, the above assumption forces the mean value of the interference to be zero. By choosing n=0, the smallest value of a can be expressed as follows:

$$\alpha = \frac{T_{FFT}}{256(T_{FFT} + T_{CP})}.$$

If $T_{FFT}$=20 μsec is used for 50 KHz OFDM subcarrier spacing, and $T_{CP}$=2.5 μsec, $\alpha$=0.003472. The resulting frequency shift from the scattered pilot location is $\alpha\Delta f$=173.6 Hz for $\alpha$=0.003472.

The second CWT tone is inserted to the left (LSB CWT tone signal) of the scattered pilot signals as defined below.

$X_{CWT-LSB}[k]=A_k e^{j2\pi\Delta f(k-\alpha)}.$

And finally, the double-sideband CWT tone signals around the location of the scattered pilot signals at the OFDM frequency $k\Delta f$ is defined as follows:

$X_{CWT-DSB}[k]=A_k e^{j2\pi\Delta f(k+\alpha)}+A_k e^{j2\pi\Delta f(k-\alpha)}.$ By continuing with the same equation format, corresponding pairs of double-sideband CWT tone signals are placed at the next scattered pilot signal location 128 OFDM sub-carriers apart. The arrangement of double sideband CWT tone signals used by the Sounding Test CM 170 and the average RxMER measured by the other Sounding Measurer CMs will result in double-side characterization of the variance of the interference at the scattered pilot locations.

In addition to increasing the effectiveness of the interference measurement, the use of pairs of double-sideband CWT tone signals improve the overall system efficiency by either minimizing the amount of time used for testing and/or decreasing the number of scattered sub-carriers used in the RxMER calculation.

The same technique described above can be repeated for placing additional pairs of CWT tone signals on either side of each scattered pilot, which is describe below with reference to FIG. 4. This results in multiple pairs of double-sideband tones used to characterize the interference noise around the scattered pilot signals. This is possible, by choosing the phase difference $\Delta\Phi=(2n+1)\pi$ which results in cancelling the mean of CWT tone signals between successive scattered pilot signals for a small value of n without introducing excessive inter-channel interference to the adjacent OFDM subcarriers.

By choosing n=1, the next smallest value of a can be expressed as follows:

$$\alpha = \frac{3T_{FFT}}{256(T_{FFT} + T_{CP})}.$$

If $T_{FFT}$=20 μsec for 50 KHz OFDM subcarrier spacing and $T_{CP}$=2.5 μsec, $\alpha$=0.010417. The resulting frequency shift from the scattered pilot location is $\alpha\Delta f$=520.84 Hz for $\alpha$=0.010417.

In FIG. 3, double-sideband CWT sounding carriers 348, 368, 388 are provided for each scattered sub-carrier location. The CWT sounding modulating carriers are placed on both side of each scattered pilot signal by a small offset from the center frequency. In FIG. 3, Upper-sideband CWT tone signal 342 is offset from Scattered Pilot signal 340 by a positive fractional OFDM frequency spacing, +$\alpha\Delta f$ 343. Lower-sideband CWT tone signal 344 is offset from Scattered Pilot signal 340 by a negative fractional OFDM frequency spacing, −$\alpha\Delta f$ 345. Upper-sideband CWT tone signal 362 is offset from Scattered Pilot signal 360 by a positive fractional OFDM frequency spacing, +$\alpha\Delta f$ 363. Lower-sideband CWT tone signal 364 is offset from Scattered Pilot signal 360 by a negative fractional OFDM frequency spacing, −$\alpha\Delta f$ 365. Upper-sideband CWT tone signal 382 is offset from Scattered Pilot signal 380 by a positive fractional OFDM frequency spacing, +$\alpha\Delta f$ 383. Lower-sideband CWT tone signal 384 is offset from Scattered Pilot signal 380 by a negative fractional OFDM frequency spacing, −$\alpha\Delta f$ 385. In FIG. 3, the Scattered Pilot signals 340, 360, 380 are consecutive scattered pilot signals. However, a group of non-consecutive, periodic scattered pilot signals could be used.

Successive Lower-sideband CWT tone signals are matched to each other. For example, FIG. 3 shows that Lower-sideband CWT tone signal 344 and Lower-sideband CWT tone signal 364 are spaced with a 180 degree phase difference 390. The same applies for each successive pair of Lower-sideband CWT tone signals. Similarly, the respective Upper-sideband CWT tone signals are matched. For example, FIG. 3 shows that Upper-sideband CWT tone signal 342 and Upper-sideband CWT tone signal 362 are spaced with a 180 degree phase difference 392. The same applies for each successive pair of Upper-sideband CWT tone signals. This ensures that the mean value of the CWT tone signals is zero for each successive scattered pilot signal. Hence, only the variance of the CWT tone signals interfering carriers are measured by the FDX measurer cable modems. By employing a double-sideband (DSB) CWT tone signals 348, 368, 388 at each location of the Scattered Pilot signals 340, 360, 380, respectively, the accuracy of interference measurement is significantly improved. The interfering noise is characterized around the center of the Scattered Pilot signals 340, 360, 380 which would resemble the characteristic of real noise-like signal (i.e., interference).

Figure 4:
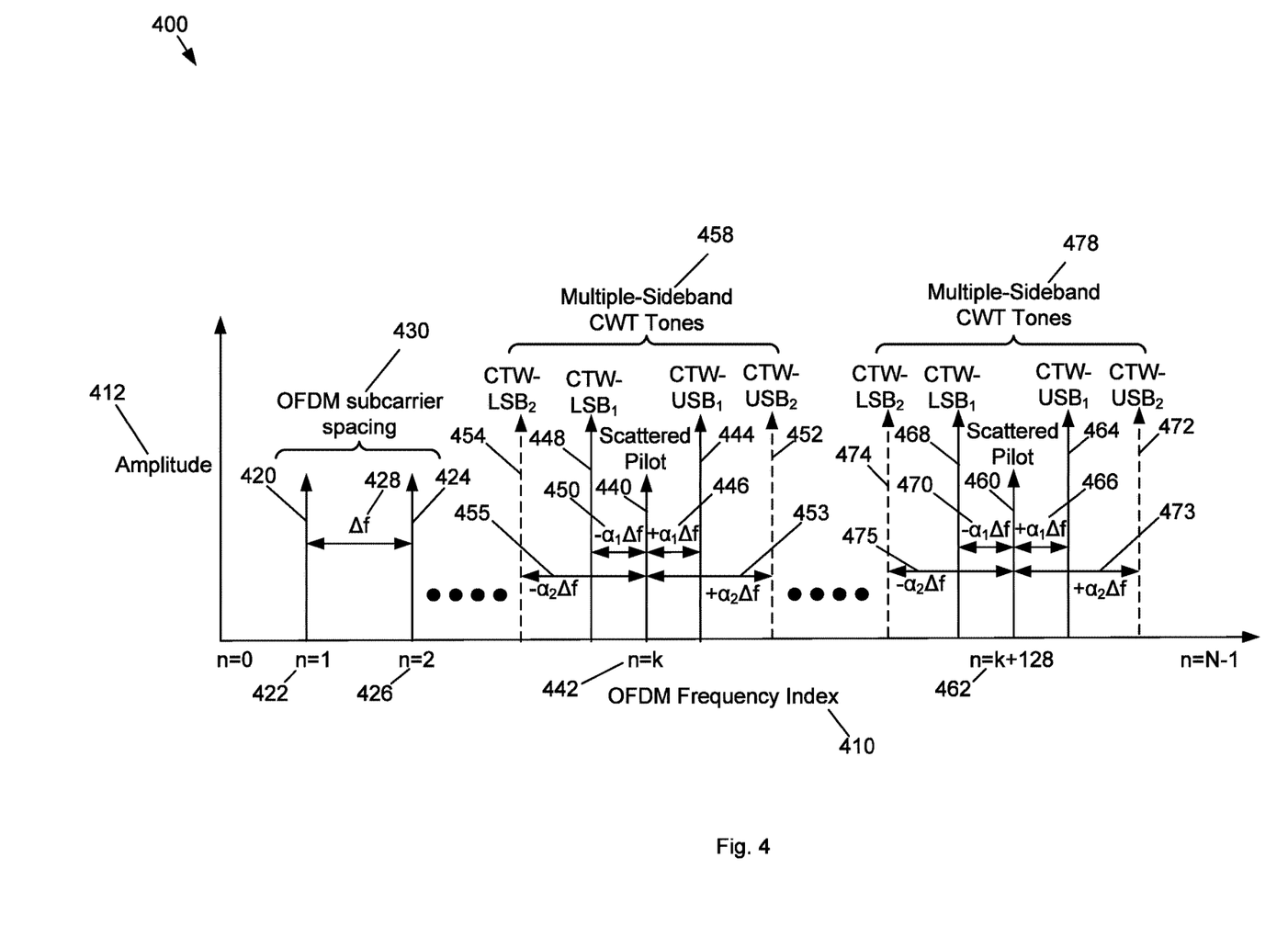
FIG. 4 illustrates a graph of multiple double-sideband continuous wave test (CWT) tone signals offset from locations of scattered pilot signals by fractional OFDM offset frequency spacing parameters.

FIG. 4 illustrates a graph 400 of multiple double-sideband continuous wave test (CWT) tone signals offset from locations of scattered pilot signals by fractional OFDM offset frequency spacing parameters.

FIG. 4 also shows an axis for OFDM Frequency Indices 410 and an axis for Amplitude 412. Similar to FIGS. 2-3, FIG. 4 also shows OFDM sub-carrier signals 420, 424. OFDM data sub-carrier signal 420 has an OFDM Frequency Index n=1 422. OFDM data sub-carrier 424 has an OFDM Frequency Index of n=2 426. The OFDM data sub-carrier signals 420, 424 are separated by an OFDM subcarrier spacing 430 of Δf 428. FIG. 4 also shows Scattered Pilot signals 440, 460. Scattered Pilot signal 440 has an OFDM Frequency Index of n=k 442, and Scattered Pilot signal 460 has an OFDM Frequency Index of n=k+128 462. The Scattered Pilot signals 440, 460 are separated from successive scattered pilot signals by a multiple of the OFDM subcarrier spacing 430 of 128*Δf 428. However, FIG. 4 shows multiple double-sideband continuous wave test (CWT) tone signals offset from locations of scattered pilot signals.

In FIG. 4, multiple-sideband CWT sounding carriers 458, 478 are provided for each scattered sub-carrier location. In FIG. 4, Upper-sideband CWT tone signal 444 is offset from Scattered Pilot signal 440 by a positive fractional OFDM frequency spacing, +$\alpha_1$Δf 446. Lower-sideband CWT tone signal 448 is offset from Scattered Pilot signal 440 by a negative fractional OFDM frequency spacing, −$\alpha_1$Δf 450. Upper-sideband CWT tone signal 452 is offset from Scattered Pilot signal 440 by a positive fractional OFDM frequency spacing, +$\alpha_2$Δf 453. Lower-sideband CWT tone signal 454 is offset from Scattered Pilot signal 440 by a negative fractional OFDM frequency spacing, −$\alpha_2$Δf 455.

Similarly, Upper-sideband CWT tone signal 464 is offset from Scattered Pilot signal 460 by a positive fractional OFDM frequency spacing, +$\alpha_1$Δf 466. Lower-sideband CWT tone signal 468 is offset from Scattered Pilot signal 460 by a negative fractional OFDM frequency spacing, −$\alpha_1$Δf 470. Upper-sideband CWT tone signal 472 is offset from Scattered Pilot signal 460 by a positive fractional OFDM frequency spacing, +$\alpha_2$Δf 473. Lower-sideband CWT tone signal 474 is offset from Scattered Pilot signal 460 by a negative fractional OFDM frequency spacing, −$\alpha_2$Δf 475. While FIG. 4 shows two pairs of USB and LSB CWT tone signals offset from each scattered pilot signals, there could be N pairs of USB and LSB CWT tone signals offset from each scattered pilot signals. In addition, while FIG. 4 shows consecutive Scattered Pilot signals 440, 460, a group of non-consecutive, periodic scattered pilot signals could be used.

Thus, one embodiment may include a pair of double-sideband CWT tone signals surrounding each location of the scattered pilot signals as described above with reference to FIG. 3, and another embodiment may include multiple pairs of double-sideband CWT tone signals equally spaced on either side of the locations of the scattered pilot signals as shown in FIG. 4. Further, the embodiments may include one or more pairs of double-sideband CWT tone signals surrounding each location of consecutive scattered pilot signals or non-consecutive, periodic scattered pilot signals.

Figure 5:
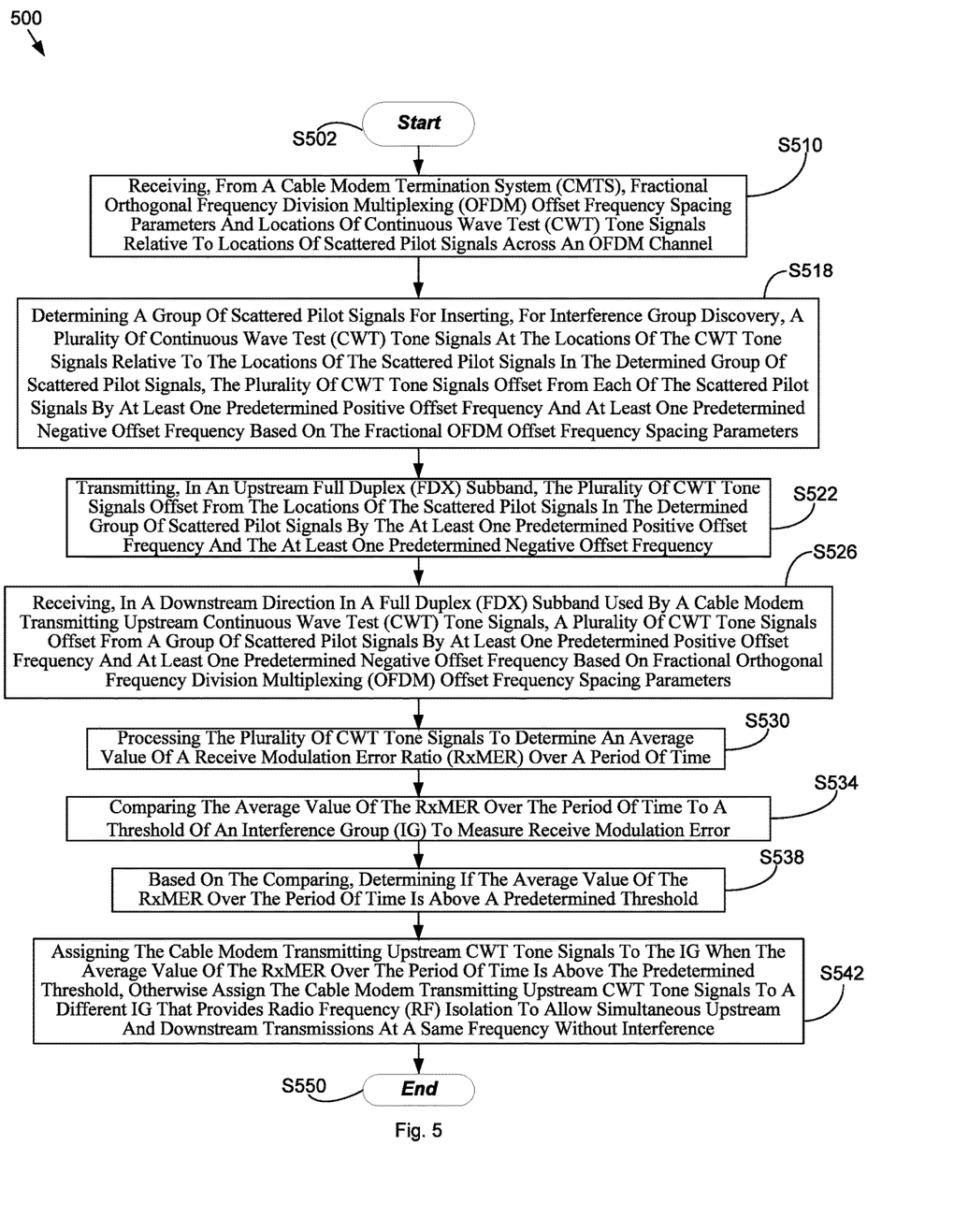
FIG. 5 is a flow chart of a method for using one or more pairs of continuous wave test (CWT) tone signals offset from locations of scattered pilot signals based on fractional OFDM offset frequency spacing parameters.

FIG. 5 is a flow chart of a method 500 for using one or more pairs of continuous wave test (CWT) tone signals offset from locations of scattered pilot signals based on fractional OFDM offset frequency spacing parameters.

In FIG. 5, method 500 starts (S502), and fractional Orthogonal Frequency Division Multiplexing (OFDM) offset frequency spacing parameters and locations of continuous wave test (CWT) tone signals relative to locations of scattered pilot signals across an OFDM channel are received from a Cable Modem Termination System (CMTS) (S510). Referring to FIG. 3, double-sideband CWT sounding carriers 348, 368, 388 are provided for each scattered sub-carrier location. The CWT sounding modulating carriers are placed on both side of each scattered pilot signal by a small offset from the center frequency A group of scattered pilot signals is determined for inserting, for interference group discovery, a plurality of continuous wave test (CWT) tone signals at the locations of the CWT tone signals relative to the locations of the scattered pilot signals in the determined group of scattered pilot signals, the plurality of CWT tone signals offset from each of the scattered pilot signals by at least one predetermined positive offset frequency and at least one predetermined negative offset frequency based on the fractional OFDM offset frequency spacing parameters (S518). Referring to FIG. 3, Scattered Pilot signals 340, 360, 380 are shown. Scattered Pilot signal 340 has an OFDM Frequency Index of n=k 341, Scattered Pilot signal 360 has an OFDM Frequency Index of n=k+128 361, and Scattered Pilot signal 380 has an OFDM Frequency Index of n=k+256 381. The Scattered Pilot signals 340, 360, 380 are separated from successive scattered pilot signals by a multiple of the OFDM subcarrier spacing 328 of 128*Δf 336.

The plurality of CWT tone signals offset from the locations of the scattered pilot signals in the determined group of scattered pilot signals by the at least one predetermined positive offset frequency and the at least one predetermined negative offset frequency are transmitted in an upstream full duplex (FDX) subband (S522). In FIG. 3, Upper-sideband CWT tone signal 342 is offset from Scattered Pilot signal 340 by a positive fractional OFDM frequency spacing, +αΔf 343. Lower-sideband CWT tone signal 344 is offset from Scattered Pilot signal 340 by a negative fractional OFDM frequency spacing, −αΔf 345.

A plurality of CWT tone signals offset from a group of scattered pilot signals by at least one predetermined positive offset frequency and at least one predetermined negative offset frequency based on fractional Orthogonal Frequency Division Multiplexing (OFDM) offset frequency spacing parameters are received in a downstream direction in a full duplex (FDX) subband used by a cable modem transmitting upstream continuous wave test (CWT) tone signals (S526). Referring to FIG. 1, Sounding Test CM 170 must transmit a sounding signal in the upstream FDX sub-band and Sounding Measurer CMs 172 (listeners) must measure the impact on the downstream channel operating in the same subband. Thus, before permitting any modem to use an FDX subband, a test cable modem, Sounding Test CM 170, is used to transmit in an upstream FDX subband and one or more cable modems, Sounding Measurer CMs 172, are used to measure the amount interference seen in the downstream direction in the same subband.

The plurality of CWT tone signals are processed to determine an average value of a Receive Modulation Error Ratio (RxMER) over a period of time (S530). Referring to FIG. 1, Several Sounding Measurer CMs 172 are used to measure the impact of interference seen in the opposite downstream in the same FDX sub-band. Each Sounding Measurer CMs 172 is commanded by the CMTS 110 to calculate the Receive Modulation Error Ratio (RxMER) and report the result to the CMTS 110.

The average value of the RxMER over the period of time are compared to a threshold of an interference group (IG) to measure receive modulation error (S534). Referring to FIG. 1, The average value of the RxMER over a period of time will be compared to an IG threshold to determine if the Sounding Test CM 170 belongs to the Sounding Measurer CMs 172 interference group, e.g., IG #N 182, or to a different interference group, e.g., IG #1 180.

Based on the comparing, a determination is made whether the average value of the RxMER over the period of time is above a predetermined threshold (S538). Referring to FIG. 1, the arrangement of double sideband CWT tone signals used by the Sounding Test CM 170 and the average RxMER measured by the other Sounding Measurer CMs will result in double-side characterization of the variance of the interference at the scattered pilot locations.

The cable modem transmitting upstream CWT tone signals is assigned to the IG when the average value of the RxMER over the period of time is above the predetermined threshold, otherwise the cable modem transmitting upstream CWT tone signals is assigned to a different IG that provides Radio Frequency (RF) isolation to allow simultaneous upstream and downstream transmissions at a same frequency without interference (S542). Referring to FIG. 1, The average value of the RxMER over a period of time will be compared to an IG threshold to determine if the Sounding Test CM 170 belongs to the Sounding Measurer CMs 172 interference group, e.g., IG #N 182, or to a different interference group, e.g., IG #1 180.

The method then ends (S550).

Figure 6:
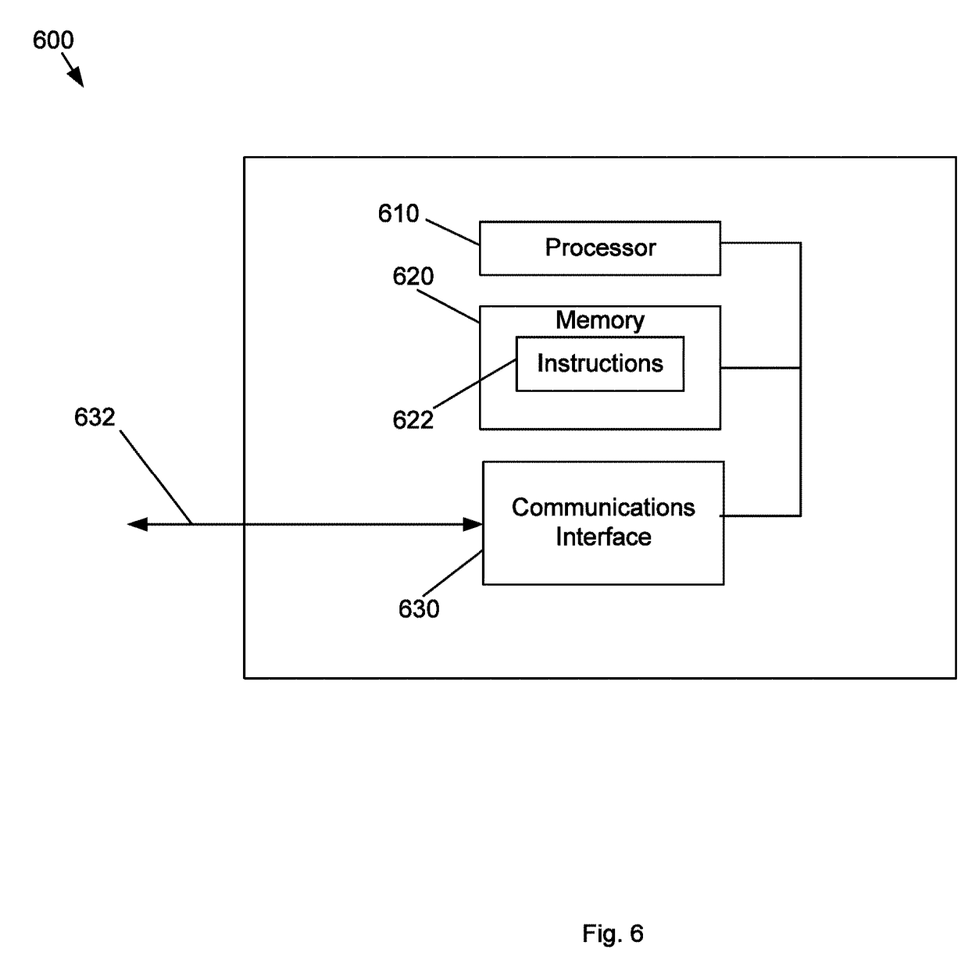
FIG. 6 illustrates a block diagram of a Cable Modem.

FIG. 6 illustrates a block diagram of a Cable Modem 600.

In FIG. 6, Cable Modem 600 includes a Processor 610, Memory 620 and Communications Interface 630. Memory 620 includes data stored therein including instructions for implementing the processes using one or more pairs of continuous wave test (CWT) tone signals offset from locations of scattered pilot signals based on fractional Orthogonal Frequency Division Multiplexing (OFDM) offset frequency spacing parameters. Cable Modem 600 communicates over communications link 632. For example, Cable Modem 600 may communicate with other cable modems, whether a Sounding Test Cable Modem 170 or a Sounding Measurer CM 172, the FDX Node 112, and CMTS 110.

Processor 610 executes the Instructions 622 in Memory 620 to receive, from a Cable Modem Termination System (CMTS), a fractional Orthogonal Frequency Division Multiplexing (OFDM) offset frequency spacing parameter and locations of continuous wave test (CWT) tone signals relative to locations of scattered pilot signals across an OFDM channel, determine a group of scattered pilot signals for inserting, for interference group discovery, a plurality of CWT tone signals at the locations of the CWT tone signals relative to the locations of the scattered pilot signals in the determined group of scattered pilot signals, the plurality of CWT tone signals offset from each of the scattered pilot signals by at least one predetermined positive offset frequency and at least one predetermined negative offset frequency based on the fractional OFDM offset frequency spacing parameters, and transmit, in an upstream full duplex (FDX) subband, the plurality of CWT tone signals offset from the locations of the scattered pilot signals in the determined group of scattered pilot signals by the at least one predetermined positive offset frequency and the at least one predetermined negative offset frequency.

Processor 610 may determine a group of consecutive scattered pilot signals or and a group of non-consecutive, periodic scattered pilot signals. Processor 610 may determine that the plurality of CWT tone signals include first CWT Upper-sideband tone signals offset from the scattered pilot signals by a first predetermined positive offset frequency based on a first of the fractional OFDM offset frequency spacing parameters, and first CWT Lower-sideband tone signals offset from the scattered pilot signals by a first predetermined negative offset frequency based on the first of the fractional OFDM offset frequency spacing parameters. Processor may determined that the plurality of CWT tone signals further include second CWT Upper-sideband tone signals offset from the scattered pilot signals by a second predetermined positive offset frequency based on a second of the fractional OFDM offset frequency spacing parameters, and a second CWT Lower-sideband tone signals offset from the scattered pilot signals by a second predetermined negative offset frequency based on the second of the fractional OFDM offset frequency spacing parameters.

Processor 610 may further receive N fractional OFDM offset frequency spacing parameters, and determine that the plurality of CWT tone signals include N CWT tone signals offset from one of the scattered pilot signals based on a different one of the N fractional OFDM offset frequency spacing parameters, wherein the N CWT tone signals comprises a Lower-sideband tone signal and an Upper-sideband tone signal, wherein the Lower-sideband tone signal is offset from one of the scattered pilot signals by the predetermined negative offset frequency based on one of the N fractional OFDM offset frequency spacing parameters and the Upper-sideband tone signal is offset from the one of the scattered pilot signals by the predetermined positive offset frequency based on the one of the N fractional OFDM offset frequency spacing parameters.

Processor 610 may be configured to execute the Instructions 622 in Memory 620 to receive, in a downstream direction in a full duplex (FDX) subband used by a cable modem transmitting upstream continuous wave test (CWT) tone signals, a plurality of CWT tone signals offset from a group of scattered pilot signals by at least one predetermined positive offset frequency and at least one predetermined negative offset frequency based on fractional Orthogonal Frequency Division Multiplexing (OFDM) offset frequency spacing parameters, process the plurality of CWT tone signals to determine an average value of a Receive Modulation Error Ratio (RxMER) over a period of time, compare the average value of the RxMER over the period of time to a threshold of an interference group (IG) to measure receive modulation error, determine if the average value of the RxMER over the period of time is above a predetermined threshold, and assign the cable modem transmitting upstream CWT tone signals to the IG when the average value of the RxMER over the period of time is above the predetermined threshold, otherwise assign the cable modem transmitting upstream CWT tone signals to a different IG that provides Radio Frequency (RF) isolation to allow simultaneous upstream and downstream transmissions at a same frequency without interference.

Processor 610 transmitting upstream CWT tone signals is not included in a same IG and is allowed to simultaneously transmit in opposite directions in a same FDX subband when the average value of the RxMER over the period of time is not above the predetermined threshold. Processor 610 reports to a Cable Modem Termination System (CMTS) the average value of the RxMER and assignment of an IG to the cable modem transmitting upstream CWT tone signals.

Processor 610 receives the plurality of CWT tone signals including first CWT Upper-sideband tone signals offset from the scattered pilot signals by a first predetermined positive offset frequency based on a first of the fractional OFDM offset frequency spacing parameters, and a first CWT Lower-sideband tone signals offset from the scattered pilot signals by a first predetermined negative offset frequency based on the first of the fractional OFDM offset frequency spacing parameters. Processor 610 may further receive second CWT Upper-sideband tone signals offset from the scattered pilot signals by a second predetermined positive offset frequency based on a second of the fractional OFDM offset frequency spacing parameters, and second CWT Lower-sideband tone signals offset from the scattered pilot signals by a second predetermined negative offset frequency based on the second of the fractional OFDM offset frequency spacing parameters.

Processor 610 may further receive N fractional OFDM offset frequency spacing parameters, and determine that the plurality of CWT tone signals include N CWT tone signals offset from one of the scattered pilot signals based on a different one of the N fractional OFDM offset frequency spacing parameters, wherein the N CWT tone signals comprises an Upper-sideband tone signal and a Lower-sideband tone signal, wherein the Upper-sideband tone signal is offset from one of the scattered pilot signals by the predetermined positive offset frequency based on one of the N fractional OFDM offset frequency spacing parameters and the Lower-sideband tone signal is offset from the one of the scattered pilot signals by the predetermined negative offset frequency based on the one of the N fractional OFDM offset frequency spacing parameters.

Accordingly, Processor 610 characterizes and discovers FDX interference group without any need for additional exchange of parameters with the CMTS beside the α parameter signaled by the CMTS for the standard single-sideband CWT tone signals. The double-sideband CWT tone signals are more efficient than the single CWT tone signals and provides more accurate characterization of interference source. The double-sideband technique can be further enhanced by adding more CWT pair tones around the scattered pilot signal locations. The more pairs of CWT tone signals that are used, the more precise the interference measurement provided by the variance of the RxMER will be.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A cable modem, comprising:
   a memory storing computer-readable instructions; and
   a processor configured to execute the computer-readable instructions to:
   receive, from a Cable Modem Termination System (CMTS), fractional Orthogonal Frequency Division Multiplexing (OFDM) offset frequency spacing parameters and locations of continuous wave test (CWT) tone signals relative to locations of scattered pilot signals across an OFDM channel;
   determine a group of scattered pilot signals for inserting, for interference group discovery, a plurality of CWT tone signals at the locations of the CWT tone signals relative to the locations of the scattered pilot signals in the determined group of scattered pilot signals, the plurality of CWT tone signals offset from each of the scattered pilot signals by at least one predetermined positive offset frequency and at least one predetermined negative offset frequency based on the fractional OFDM offset frequency spacing parameters; and
   transmit, in an upstream full duplex (FDX) subband, the plurality of CWT tone signals offset from the locations of the scattered pilot signals in the determined group of scattered pilot signals by the at least one predetermined positive offset frequency and the at least one predetermined negative offset frequency.

2. The cable modem of claim 1, wherein the determined group of scattered pilot signals are selected from one of:
   a group of consecutive scattered pilot signals; and
   a group of non-consecutive, periodic scattered pilot signals.

3. The cable modem of claim 1, wherein the plurality of CWT tone signals comprise first CWT lower-sideband tone signals offset from the scattered pilot signals by a first predetermined negative offset frequency based on a first of the fractional OFDM offset frequency spacing parameters, and first CWT upper-sideband tone signals offset from the scattered pilot signals by a first predetermined positive offset frequency based on the first of the fractional OFDM offset frequency spacing parameters.

4. The cable modem of claim 3, wherein the plurality of CWT tone signals further comprise second CWT lower-sideband tone signals offset from the scattered pilot signals by a second predetermined negative offset frequency based on a second of the fractional OFDM offset frequency spacing parameters, and a second CWT upper-sideband tone signals offset from the scattered pilot signals by a second predetermined positive offset frequency based on the second of the fractional OFDM offset frequency spacing parameters.

5. The cable modem of claim 1, wherein the fractional OFDM offset frequency spacing parameters comprises N fractional OFDM offset frequency spacing parameters, and wherein the plurality of CWT tone signals comprise N CWT tone signals offset from one of the scattered pilot signals based on a different one of the N fractional OFDM offset frequency spacing parameters wherein N is an integer.

6. The cable modem of claim 5, wherein the N CWT tone signals comprises a lower-sideband tone signal and an upper-sideband tone signal, wherein the lower-sideband tone signal is offset from one of the scattered pilot signals by the predetermined negative offset frequency based on one of the N fractional OFDM offset frequency spacing parameters and the upper-sideband tone signal is offset from the one of the scattered pilot signals by the predetermined positive offset frequency based on the one of the N fractional OFDM offset frequency spacing parameters.

7. The cable modem of claim 6, wherein a first lower-sideband tone signal of the N CWT tone signals has a first phase difference of 180 degrees from a subsequent lower-sideband tone signal of the N CWT tone signals, and wherein a first upper-sideband tone signal of the N CWT tone signals has a second phase difference of 180 degrees from a subsequent upper-sideband tone signal of the N CWT tone signals.

8. A cable modem configured to measure receive modulation error from received signals, comprising
a memory storing computer-readable instructions; and
a processor configured to execute the computer-readable instructions to:
receive, in a downstream direction in a full duplex (FDX) subband transmitting upstream continuous wave test (CWT) tone signals, a plurality of CWT tone signals offset from a group of scattered pilot signals by at least one predetermined positive offset frequency and at least one predetermined negative offset frequency based on fractional Orthogonal Frequency Division Multiplexing (OFDM) offset frequency spacing parameters;
process the plurality of CWT tone signals to determine an average value of a Receive Modulation Error Ratio (RxMER) over a period of time;
compare the average value of the RxMER over the period of time to a threshold of an interference group (IG) to measure receive modulation error;
determine if the average value of the RxMER over the period of time is above a predetermined threshold; and
assign the processor transmitting upstream CWT tone signals to the IG when the average value of the RxMER over the period of time is above the predetermined threshold, otherwise assign the processor upstream CWT tone signals to a different IG that provides Radio Frequency (RF) isolation to allow simultaneous upstream and downstream transmissions at a same frequency without interference.

9. The cable modem of claim 8, wherein the group of scattered pilot signals are selected from one of:
a group of consecutive scattered pilot signals; and
a group of non-consecutive, periodic scattered pilot signals.

10. The cable modem of claim 8, wherein the processor transmitting upstream CWT tone signals is not included in a same IG and is allowed to simultaneously transmit in opposite directions in a same FDX subband when the average value of the RxMER over the period of time is not above the predetermined threshold.

11. The cable modem of claim 8, wherein the processor reports to a Cable Modem Termination System (CMTS) the average value of the RxMER and assignment of an IG to the processor transmitting upstream CWT tone signals.

12. The cable modem of claim 8, wherein the plurality of CWT tone signals comprise first CWT lower-sideband tone signals offset from the scattered pilot signals by a first predetermined negative offset frequency based on a first of the fractional OFDM offset frequency spacing parameters, and a first CWT upper-sideband tone signals offset from the scattered pilot signals by a first predetermined positive offset frequency based on the first of the fractional OFDM offset frequency spacing parameters.

13. The cable modem of claim 12, wherein the plurality of CWT tone signals further comprise second CWT lower-sideband tone signals offset from the scattered pilot signals by a second predetermined negative offset frequency based on a second of the fractional OFDM offset frequency spacing parameters, and second CWT upper-sideband tone signals offset from the scattered pilot signals by a second predetermined positive offset frequency based on the second of the fractional OFDM offset frequency spacing parameters.

14. The cable modem of claim 8, wherein the fractional OFDM offset frequency spacing parameters comprises N fractional OFDM offset frequency spacing parameters, and wherein the plurality of CWT tone signals comprise N CWT tone signals offset from one of the scattered pilot signals based on a different one of the N fractional OFDM offset frequency spacing parameters wherein N is an integer.

15. The cable modem of claim 14, wherein the N CWT tone signals comprises a lower-sideband tone signal and an upper-sideband tone signal, wherein the lower-sideband tone signal is offset from one of the scattered pilot signals by the predetermined negative offset frequency based on one of the N fractional OFDM offset frequency spacing parameters and the upper-sideband tone signal is offset from the one of the scattered pilot signals by the predetermined positive offset frequency based on the one of the N fractional OFDM offset frequency spacing parameters.

16. The cable modem of claim 15, wherein a first lower-sideband tone signal of the N CWT tone signals has a first phase difference of 180 degrees from a subsequent lower-sideband tone signal of the N CWT tone signals, and wherein a first upper-sideband tone signal of the N CWT tone signals has a second phase difference of 180 degrees from a subsequent upper-sideband tone signal of the N CWT tone signals.

17. A method for performing Full Duplex (FDX) interference discovery using double-sideband continuous wave test (CWT) sounding pilot tone signals, comprising:
receiving, from a Cable Modem Termination System (CMTS), fractional Orthogonal Frequency Division Multiplexing (OFDM) offset frequency spacing parameters and locations of continuous wave test (CWT) tone signals relative to locations of scattered pilot signals across an OFDM channel;
determining a group of scattered pilot signals for inserting, for interference group discovery, a plurality of continuous wave test (CWT) tone signals at the locations of the CWT tone signals relative to the locations of the scattered pilot signals in the determined group of scattered pilot signals, the plurality of CWT tone signals offset from each of the scattered pilot signals by at least one predetermined positive offset frequency and at least one predetermined negative offset frequency based on the fractional OFDM offset frequency spacing parameters; and
transmitting, in an upstream full duplex (FDX) subband, the plurality of CWT tone signals offset from the locations of the scattered pilot signals in the determined group of scattered pilot signals by the at least one predetermined positive offset frequency and the at least one predetermined negative offset frequency.

18. The method of claim 17, wherein the determining the group of scattered pilot signals further comprises selecting one of:
a group of consecutive scattered pilot signals; and
a group of non-consecutive, periodic scattered pilot signals.

19. The method of claim 17, wherein the inserting the plurality of CWT tone signals further comprises inserting first CWT lower-sideband tone signals offset from the scattered pilot signals by a first predetermined negative offset frequency based on a first of the fractional OFDM offset frequency spacing parameters, and inserting first CWT upper-sideband tone signals offset from the scattered pilot signals by a first predetermined positive offset frequency based on the first of the fractional OFDM offset frequency spacing parameters.

20. The method of claim 19, wherein the inserting the plurality of CWT tone signals further comprises inserting second CWT lower-sideband tone signals offset from the scattered pilot signals by a second predetermined negative offset frequency based on a second of the fractional OFDM offset frequency spacing parameters, and inserting second CWT upper-sideband tone signals offset from the scattered pilot signals by a second predetermined positive offset frequency based on the second of the fractional OFDM offset frequency spacing parameters.

21. The method of claim 17, wherein the receiving the fractional OFDM offset frequency spacing parameters further comprises receiving N fractional OFDM offset frequency spacing parameters, and wherein the inserting the plurality of CWT tone signals further comprises inserting N CWT tone signals offset from one of the scattered pilot signals based on a different one of the N fractional OFDM offset frequency spacing parameters wherein N is an integer.

22. The method of claim 21, wherein the inserting N CWT tone signals further comprises inserting a lower-sideband tone signal and an upper-sideband tone signal, wherein the lower-sideband tone signal is offset from one of the scattered pilot signals by the predetermined negative offset frequency based on one of the N fractional OFDM offset frequency spacing parameters and the upper-sideband tone signal is offset from the one of the scattered pilot signals by the predetermined positive offset frequency based on the one of the N fractional OFDM offset frequency spacing parameters.

23. The method of claim 22, wherein the inserting N CWT tone signals further comprises inserting a first lower-sideband tone signal of the N CWT tone signals having a first phase difference of 180 degrees from a subsequent lower-sideband tone signal of the N CWT tone signals, and inserting a first upper-sideband tone signal of the N CWT tone signals having a second phase difference of 180 degrees from a subsequent upper-sideband tone signal of the N CWT tone signals.

* * * * *